United States Patent
Wu

(10) Patent No.: US 8,649,290 B2
(45) Date of Patent: Feb. 11, 2014

(54) METHOD AND APPARATUS FOR CONTROLLING TIMING OF NETWORK PERFORMANCE LOGGING IN A WIRELESS COMMUNICATION SYSTEM

(75) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 13/423,106

(22) Filed: Mar. 16, 2012

(65) Prior Publication Data

US 2012/0165002 A1   Jun. 28, 2012

Related U.S. Application Data

(63) Continuation of application No. 13/301,663, filed on Nov. 21, 2011, which is a continuation of application No. 13/234,081, filed on Sep. 15, 2011.

(60) Provisional application No. 61/384,716, filed on Sep. 21, 2010.

(51) Int. Cl.
 *G01R 31/08* (2006.01)
 *G08C 17/00* (2006.01)

(52) U.S. Cl.
 USPC ........ 370/252; 370/311; 370/328; 455/67.11; 455/423

(58) Field of Classification Search
 None
 See application file for complete search history.

(56) References Cited

U.S. PATENT DOCUMENTS

| | | | |
|---|---|---|---|
| 6,822,973 B2 | 11/2004 | Kelley et al. | |
| 7,263,351 B2 | 8/2007 | Ross et al. | |
| 7,395,083 B2 | 7/2008 | Buckley | |
| 7,417,970 B2 | 8/2008 | Shaheen | |
| 7,489,919 B2 | 2/2009 | Cheng | |
| 8,099,504 B2 | 1/2012 | Cherian et al. | |
| 8,121,589 B2 | 2/2012 | Fischer et al. | |
| 2004/0218555 A1* | 11/2004 | Chen et al. | 370/311 |

(Continued)

FOREIGN PATENT DOCUMENTS

| | | |
|---|---|---|
| EP | 1772994 | 4/2007 |
| EP | 2360961 | 8/2011 |

OTHER PUBLICATIONS

ETSI TS 125 331 V10.4.0 (Jul. 2011) Universal Mobile Telecommunications System (UMTS); Radio Resource Control (RRC); Protocol specification (3GPP TS 25.331 version 10.4.0 Release 10).*

(Continued)

*Primary Examiner* — Yemane Mesfin
*Assistant Examiner* — Christine Duong
(74) *Attorney, Agent, or Firm* — Perkins Coie LLP

(57) ABSTRACT

A method and system controls timing of network performance information logging of a cellular network by configuring a mobile device to automatically collect data about physical characteristics of the cellular network and log that data. The mobile device initially receives network performance information logging configuration from its registered cellular network. Based on the configuration, the mobile device configures itself to collect and log the network performance information relating to physical characteristics of the cellular network. While in idle mode, the mobile device collects and logs the information. A logging duration timer corresponds to a specified time duration over which the mobile device logs network performance information. If the mobile device starts the logging duration timer at the time of configuration, it maintains the timer even after the transition to idle mode. The mobile device may also start the logging duration timer after it transitions to idle mode.

4 Claims, 8 Drawing Sheets

(56) References Cited

U.S. PATENT DOCUMENTS

| | | | |
|---|---|---|---|
| 2006/0294214 | A1 | 12/2006 | Chou |
| 2007/0224988 | A1 | 9/2007 | Shaheen |
| 2008/0125108 | A1 | 5/2008 | Kuo et al. |
| 2008/0167044 | A1 | 7/2008 | Natsume |
| 2008/0220782 | A1* | 9/2008 | Wang et al. ............ 455/436 |
| 2009/0310501 | A1 | 12/2009 | Catovic et al. |
| 2010/0190488 | A1 | 7/2010 | Jung et al. |
| 2010/0317405 | A1 | 12/2010 | Keevill et al. |
| 2011/0039548 | A1 | 2/2011 | Wu |
| 2011/0145317 | A1 | 6/2011 | Serban et al. |
| 2011/0195668 | A1* | 8/2011 | Lee et al. ............ 455/67.11 |
| 2011/0201279 | A1* | 8/2011 | Suzuki et al. ......... 455/67.11 |
| 2011/0319064 | A1* | 12/2011 | Lenart et al. .......... 455/418 |
| 2012/0040621 | A1* | 2/2012 | Jung et al. ............ 455/67.11 |
| 2012/0069760 | A1 | 3/2012 | Wu |
| 2012/0092998 | A1* | 4/2012 | Chang et al. ........... 370/241 |

OTHER PUBLICATIONS

3GPP TS 23.122 version 9.3.0 Release 9; ETSI 3rd Generation Partnership Project (3GPP); Jun. 2010.

3GPP TS 36.331 version 9.3.0 Release 9; ETSI 3rd Generation Partnership Project (3GPP); Jun. 2010.

3GPP TS 37.320 version 0.7.0 Release 10; ETSI 3rd Generation Partnership Project (3GPP); Jun. 2010.

3GPP TS 37.320 version 1.0.0 Release 10; ETSI 3rd Generation Partnership Project (3GPP); Aug. 2010.

Ericsson, Nokia Siemens Networks; "Handling of MDT trace sessions at UE connected-idle state transitions;" 3GPP TSG-SA5 (Telecom Management) SA5#73; S5-102532; New Delhi, India; Aug. 23-27, 2010.

ETSI MCC; "Report of 3GPP TSG RAN WG2 Meeting #70;" 3GPP TSG-RAN WG2 #70bis; R2104199; Stockholm, Sweden; Jun. 28-Jul. 2, 2010.

European Search Report for EP Application No. 11007680.9; HTC Corporation; Jan. 5, 2012, 6 pages.

Samsung; "Procedure for logged MDT in idle;" 3GPP TSG-RAN WG2 #69bis; R2-102292; Beijing, China; Apr. 12-16, 2010.

Wong, et al.; "A Multilayered Mobility Management Scheme for Auto-Configured Wireless IP Networks;" IEEE Wireless Communications, v 10, n 5, p. 62-9; Oct. 2003.

EMAI discussion rapporteur (Nokia Siemens Network); "Report on email discussion [69#30] trying to progress main MDT open issues;"3GPP TSG-RAN WG2 #62bis; R2 102517; Beijing, China; Apr. 12-16, 2010.

European Search Report for EP Application No. 11005684.3; HTC Corporation; Nov. 22, 2011, 5 pages.

Jokela, Petri, Wireless Internet Access Using Anonymous Access Methods, 1999 IEEE International Workshop on Mobile Multimedia Communications (MoMuC'99) (Cat. No. 99EX384), p. 194-7, 1999.

Kyocera; "Some considerations for logged MDT;" 3GPP TSG-RAN WG2 #69bis; R2-102389; Beijing, China; Apr. 12-16, 2010.

Non-Final Office Action for U.S. Appl. No. 13/178,205; Applicant HTC Corporation; Date of Mailing: Feb. 15, 2012; 12 pages.

NTT Docomo, Inc.; "MDT support for roaming and network sharing scenarios;" 3GPP TSG-RAN WG2 #70; R2-102997; Montreal; Canada; May 10-14, 2010.

* cited by examiner

METHOD AND APPARATUS FOR CONTROLLING TIMING OF NETWORK PERFORMANCE LOGGING IN A WIRELESS COMMUNICATION SYSTEM

CROSS-REFERENCE TO RELATED APPLICATION(S)

This application is a continuation of U.S. patent application Ser. No. 13/301,663, filed on Nov. 21, 2011 and titled METHOD AND APPARATUS FOR CONTROLLING TIMING OF NETWORK PERFORMANCE LOGGING IN A WIRELESS COMMUNICATION SYSTEM, which is a continuation of U.S. patent application Ser. No. 13/234,081, filed on Sep. 15, 2011 and titled METHOD AND APPARATUS FOR CONTROLLING TIMING OF NETWORK PERFORMANCE LOGGING IN A WIRELESS COMMUNICATION SYSTEM, which claims the benefit of U.S. Provisional Application No. 61/384,716, filed on Sep. 21, 2010 and titled Method and Apparatus for Handling MDT Logging in a Wireless Communication System, each of which is incorporated herein by reference in its entirety.

BACKGROUND

A cellular network consists of multiple base stations, each of which has a coverage area. Mobile devices, such as cellular phones, smart phones, tablets, and portable computers, wirelessly connect to these base stations to receive services such as data and voice connectivity. The extent of the coverage of a cellular network is defined by the reach of the individual base stations in the network and by the configuration of those base stations. Physical design considerations, such as transmission power, base station location, and antenna angle, play a significant role in determining the extent of a cellular network's coverage. In the past, a network provider could determine the extent and effectiveness of its network coverage only by sending technicians or testers into the field to test the coverage (e.g., the strength of signal) at particular locations. End users had little opportunity to participate in improving the network, except by complaining to customer service representatives. However, because of the large geographical extent of these cellular networks, it is difficult and expensive for network providers to perform extensive network testing by themselves. For this reason, standards organizations have recently developed mechanisms for using customers' mobile devices to collect network information that can be used to evaluate network effectiveness. However, designing this data collection mechanism is complicated because it is difficult to effectively collect data without also wasting significant amounts of power.

DETAILED DESCRIPTION

A method and system for controlling the timing of network performance logging by a mobile device operating in a cellular network is disclosed (hereinafter the "network performance logging system" or the "system"). The network performance logging system operates in a cellular network where a mobile device is configured to log network performance information relating to physical characteristics of the wireless network. At various times during operation, the mobile device connects with the cellular network and uploads network performance information logged over a period of time. A mobile device is initially configured to log this information based on a message from the cellular network. This may be, for example, a configuration message received by the mobile device when it initially connects to and registers with the cellular network. The configuration message is generally received when the mobile device is in a connected mode, i.e., a mode in which the mobile device is actively communicating with the cellular network. In general, the configuration message directs the mobile device to periodically log information relating to physical characteristics of the cellular network, such as signal strength received from the current base station. The mobile device logs the information to a location in memory or long-term storage. In some embodiments, the mobile device is configured to log this network performance information only when it is operating in idle mode.

The cellular network can control the length of time that the mobile device will log network performance information. To do so, the cellular network sends the mobile device a logging duration that specifies the duration over which the mobile device will carry out the logging. In some embodiments, the mobile device starts a logging duration timer when it initially configures the network performance logging system. When the mobile device transitions to idle mode, the mobile device cancels most or all of the other timers that it set while operating in connected mode. However, the mobile device will continue running the logging duration timer even after it transitions to idle mode. In other embodiments, the mobile device is configured to start the logging duration timer when it transitions to the idle mode. In either case, the mobile device logs network performance information while operating in the idle mode. The mobile device stops logging this information when the logging duration timer expires. The logging duration timer allows the mobile device to avoid unnecessarily draining its battery while logging network performance information. The logging duration timer may have various lengths, such as 10 minutes, 20 minutes, 40 minutes, 60 minutes, 90 minutes, or 120 minutes.

Figure 1:
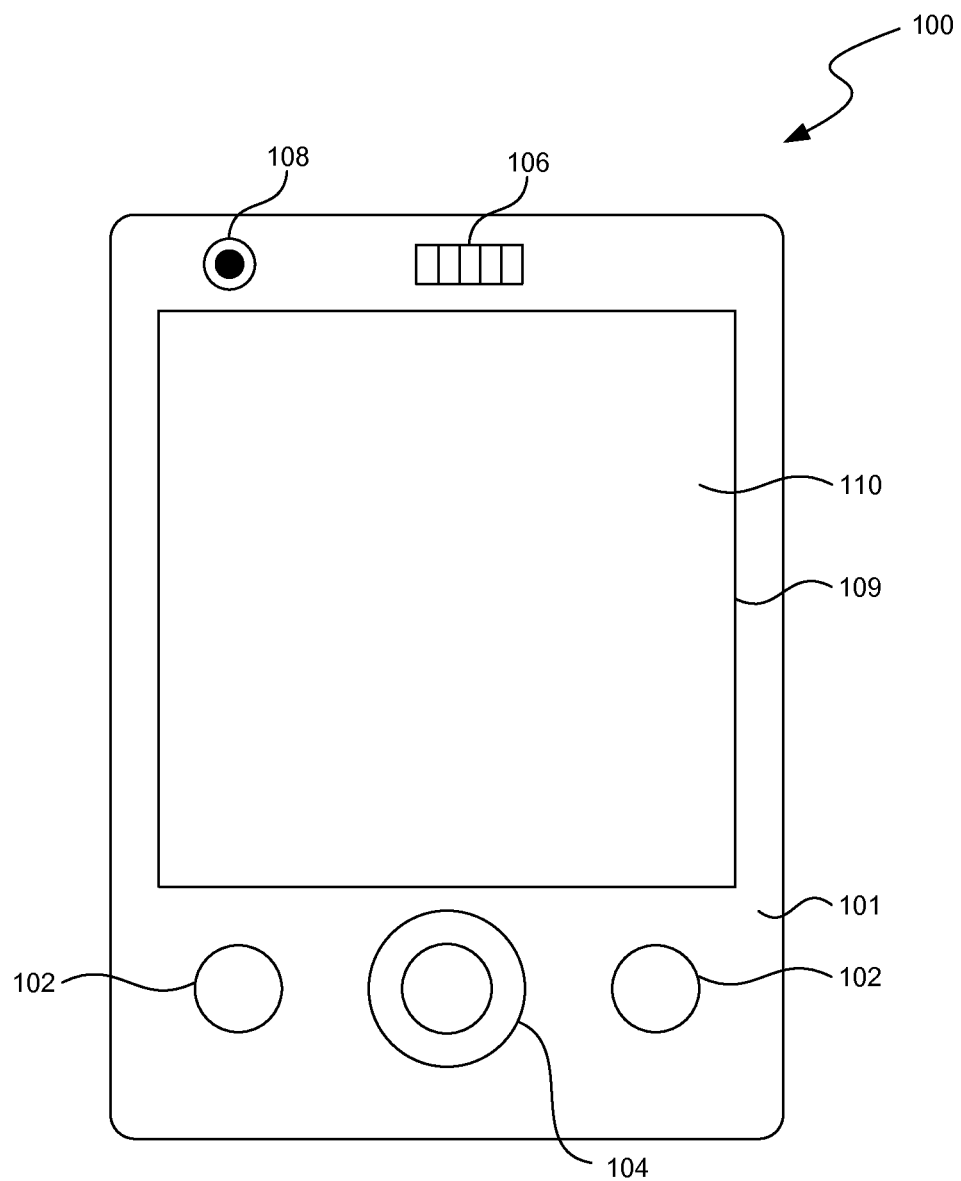
FIG. 1 is a front view of an exemplary mobile device suitable for implementing a network performance logging system.

FIG. 1 is a front view of a mobile device 100 suitable for implementing a network performance logging system. The term "mobile device," as used herein, may be a cell phone, a personal digital assistant ("FDA"), a portable email device (e.g., a Blackberry® device), a portable media player (e.g., an Apple iPod Touch®), a tablet or slate computer (e.g., an Apple iPad®), a netbook computer, a notebook computer, an e-reader, or any other device having wireless communication capability. As shown in FIG. 1, the mobile device 100 may comprise a housing 101, a plurality of push buttons 102, a directional keypad 104 (e.g., a five-way key, a joystick, a trackball, or an optical mouse), a speaker 106, a camera 108, and a display 110 carried by the housing 101. The mobile device 100 may also comprise microphones, transceivers, photo sensors, and/or other computing components generally found in PDA devices, cellular phones, laptop computers, tablets, smart phones, handheld email devices, or other mobile communication/computing devices.

The display 110 may comprise a liquid-crystal display (LCD), a plasma display, a vacuum fluorescent display, a light-emitting diode (LED) display, a field emission display, and/or other suitable types of display configured to present a user interface. The mobile device 100 also comprises a touch sensing component 109 configured to receive input from a user. For example, the touch sensing component 109 may comprise a resistive, capacitive, infrared, surface acoustic wave (SAW), and/or other type of touch screen. The touch sensing component 109 may be integrated with the display 110 or may be independent from the display 110. In the illustrated example, the touch sensing component 109 and the display 110 have similarly sized access areas in general. In other examples, the touch sensing component 109 and the display 110 may have different-sized access areas. For example, the touch sensing component 109 may have an access area that extends beyond the boundaries of the display 110.

Figure 2:
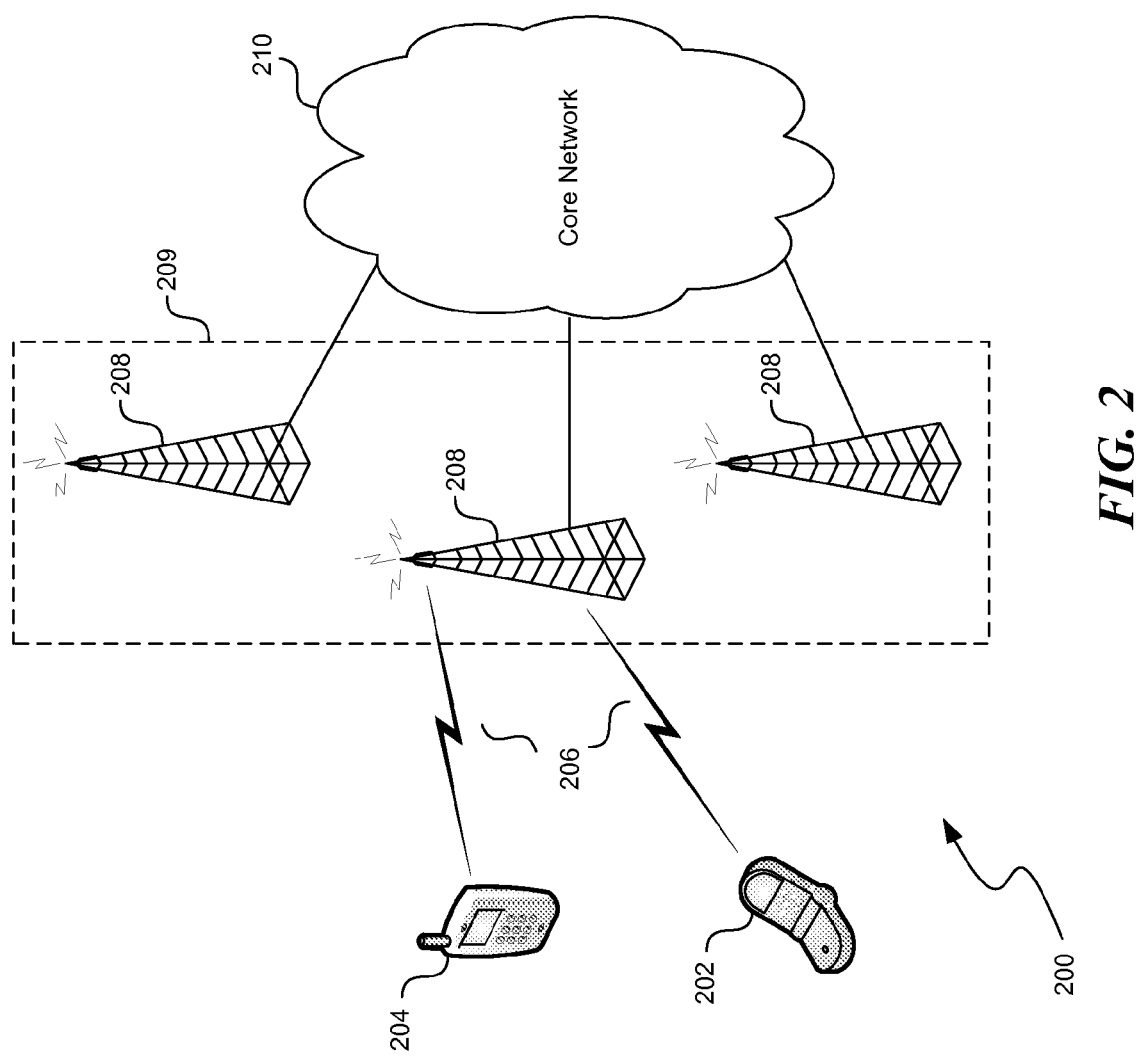
FIG. 2 is a network diagram of an exemplary environment in which a mobile device operates.

FIG. 2 is a network diagram of a representative environment 200 in which the network performance logging system operates. A core network 210 operates with the RAN 209 to manage maintenance functionality, such as the network performance logging discussed below. Mobile devices 202 and 204 roam in an area covered by a radio access network (RAN) 209, such as UTRAN or EUTRAN. The mobile devices 202 and 204 are, for example, the mobile device 100 shown in FIG. 1. The mobile devices 202 and 204 communicate to a base station 208 through a wireless connection 206. The wireless connection 206 could be implemented using any system for transmitting digital data. For example, the connection could use a cellular network implementing Global System for Mobile Communications ("GSM"), Universal Mobile Telephone Services ("UMTS"), Long-Term Evolution ("LTE"), or CDMA2000 or a non-cellular network implementing WiFi (IEEE 802.11) or Bluetooth.

Figure 3:
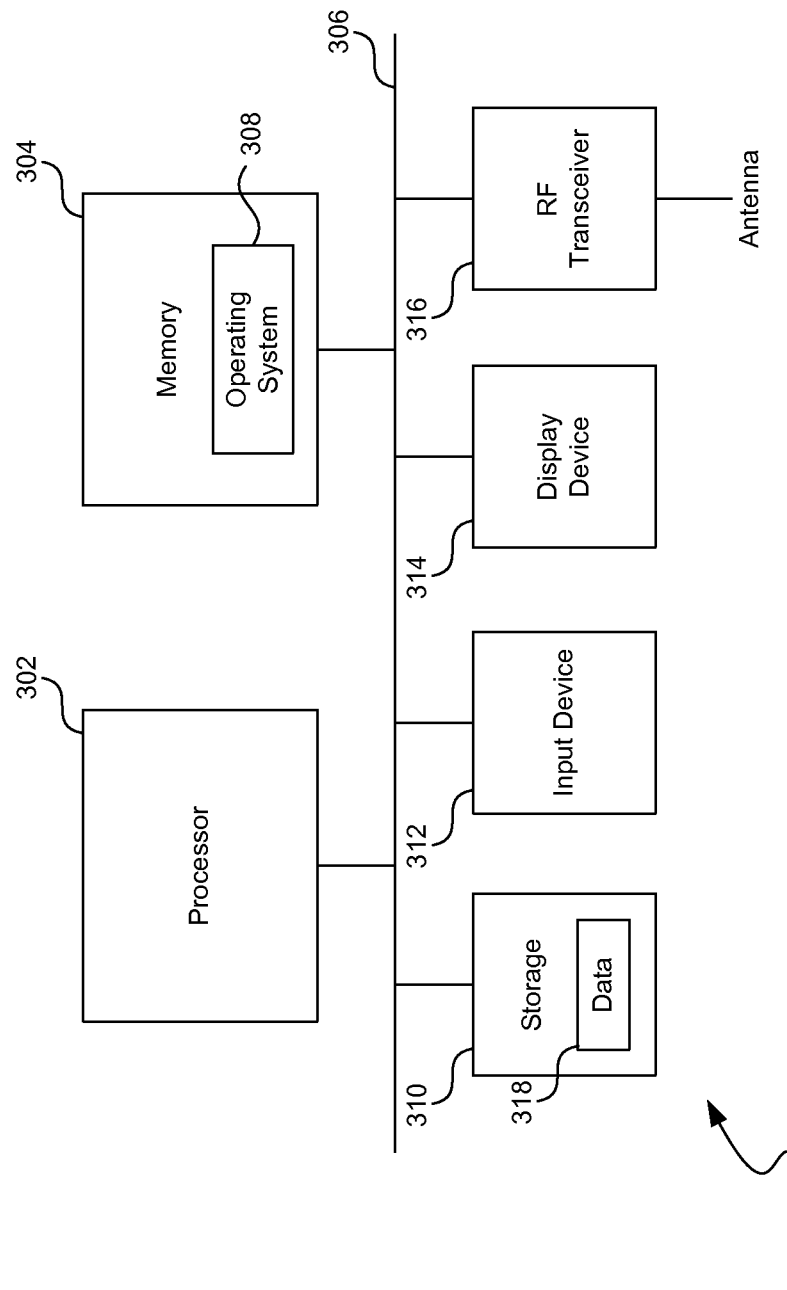
FIG. 3 is a high-level block diagram showing an example of the architecture of the mobile device.

FIG. 3 is a high-level block diagram showing an example of the architecture of a device 300. The device 300 may represent the mobile devices 202 and 204 of FIG. 2. The device 300 comprises one or more processors 302 and memory 304 coupled to an interconnect 306. The interconnect 306 shown in FIG. 3 is an abstraction that represents any one or more separate physical buses, one or more point-to-point connections, or both buses and point-to-point connections connected by appropriate bridges, adapters, or controllers. The interconnect 306, therefore, may comprise, for example, a system bus, a Peripheral Component Interconnect (PCI) family bus, a HyperTransport or industry standard architecture (ISA) bus, a small computer system interface (SCSI) bus, a universal serial bus (USB), a IIC (I2C) bus, or an Institute of Electrical and Electronics Engineers (IEEE) standard 1394 bus, sometimes referred to as a "Firewire."

The processor(s) 302 may comprise central processing units (CPUs) of the device 300 and, thus, control the overall operation of the device 300. In certain examples, the processor(s) 302 accomplish this by executing software or firmware stored in the memory 304. The processor(s) 302 may be, or may comprise, one or more programmable general purpose or special purpose microprocessors, digital signal processors ("DSPs"), programmable controllers, application-specific integrated circuits ("ASICs"), programmable logic devices ("PLDs"), or the like, or a combination of such devices.

The memory 304 is, or comprises, the main memory of the device 300. The memory 304 represents any form of fixed or removable random access memory (RAM), read-only memory (ROM), flash memory, or the like, or a combination of such devices. In use, the memory 304 stores, among other things, an operating system 308 of the device 300.

The device 300 comprises an input device 312 that enables a user to control the device. The input device 312 may comprise a keyboard, trackpad, touch sensitive screen (e.g., the touch sensing component 109 of FIG. 1), or other standard computer input device. The device 300 also comprises a display device 314 suitable for displaying a user interface, such as the display 110 (FIG. 1). The device 300 further comprises a radio frequency (RF) transceiver 316 that allows the device 300 to communicate with remote devices over a network and may be, for example, a wireless adapter. The device 300 may further comprise local storage 310 coupled to the interconnect 306. The local storage 310 may comprise, for example, a flash memory device that is configured to provide mass storage and that stores data 318 used by the mobile device.

In designing and maintaining a cellular network, a network provider must adjust a number of design parameters to ensure optimum coverage for the network. Examples of these parameters include the number and location of base stations, the transmission power of individual antennas of the base stations, and the direction and angle of individual antennas at the base stations. For example, individual base stations generally have multiple antennas that can be arranged independently to ensure optimum coverage. A network provider may configure the base station by adjusting the power distribution among the multiple antennas to reduce power to an antenna that covers an area that is also well-covered by other base stations, while increasing power to an antenna that covers an area by itself.

However, it is often complicated and labor-intensive for a network provider to determine the optimum parameters for configuring its base stations. In the past, network providers have been required to send out technicians with measurement equipment to various locations to evaluate the network's performance. This is time consuming and expensive. A particular problem arises when conditions in an area change after the base station was initially deployed. For example, the network provider might have measured the performance of a base station extensively when the base station was initially deployed, but it might not have been able to perform additional measurements afterward. If a new building is built in an area, network performance might degrade in that particular area. However, the network provider might not become aware of that performance degradation for quite some time.

Because of this, organizations responsible for maintaining cellular standards developed procedures that allow the network providers to take advantage of data collected by end users' mobile devices. A particular example of this process is the Minimization of Drive Tests ("MDT") procedure developed by the 3rd Generation Partnership Project ("3GPP"), which is responsible for developing the GSM, UMTS, and LTE standards. The MDT procedure is described in various 3GPP standards documents, including 3GPP TS 37.320, TS 36.331, TS 36.304, TS 25.304 and TS 25.331.

Figure 4:
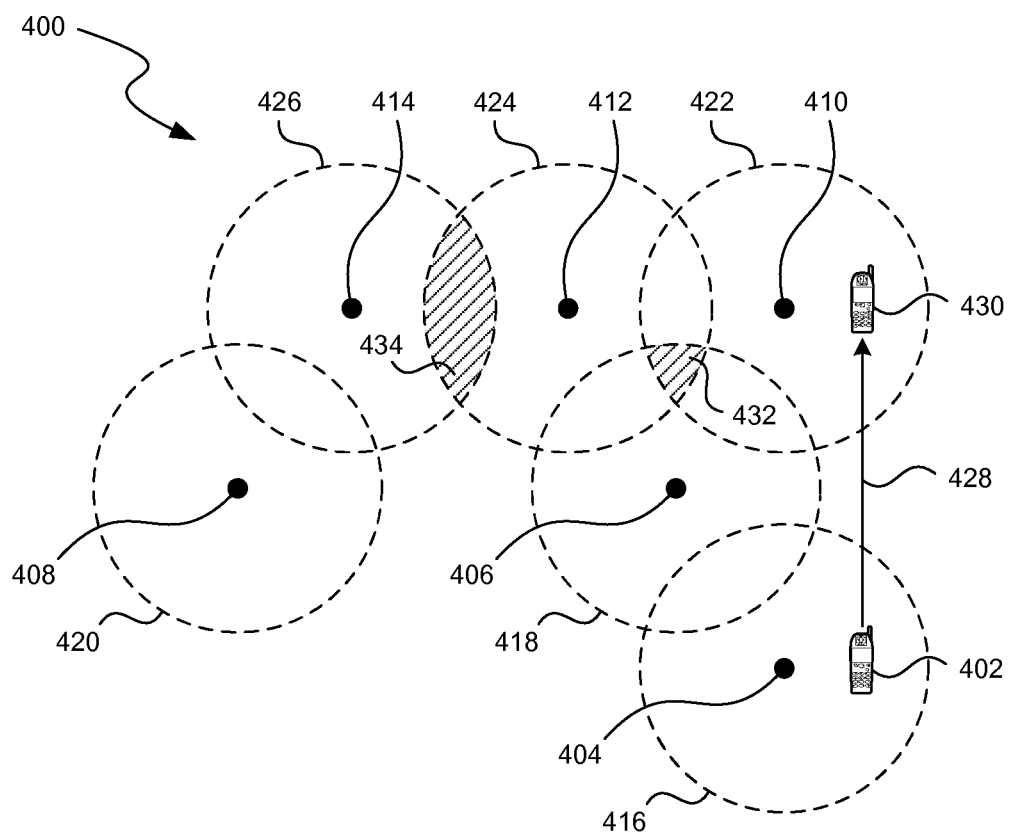
FIG. 4 illustrates an exemplary environment in which a mobile device moves within the coverage area of a cellular network.

FIG. 4 illustrates an exemplary environment in which a mobile device 402 moves within the coverage area of a cellular network 400. As shown in FIG. 4, the cellular network 400 includes multiple base stations 404, 406, 408, 410, 412, and 414. Each of the base stations has a corresponding coverage area 416, 418, 420, 422, 424, and 426, respectively. The cellular network 400 is defined by the combination of these coverage areas. As shown in FIG. 4, the cellular network 400 includes areas of high coverage, such as areas 432 and 434, where coverage areas from multiple base stations overlap. Similarly, the cellular network 400 includes multiple areas where there is no coverage at all because of range limitations of individual base stations. Although not shown in the figure, a cellular network 400 may also include areas of limited coverage within the defined coverage areas 416, 418, 420, 422, 424, and 426 that occur because of geographical features or buildings that interfere with coverage.

As shown in the figure, the mobile device 402 is initially located in coverage area 416, which is generated by base station 404. Over a period of time, the mobile device 402 moves along a path 428 to an endpoint 430 within the coverage area 422 that is generated by the base station 410. As part of its movement along the path 428, the mobile device 402 passes through an area of no coverage that exists between the coverage area 416 and the coverage area 422. During its movement along the path 428, the mobile device 402 attempts to maintain a continuous connection to the network 400. As part of this process, the mobile device 402 detects and measures signals from nearby base stations. Network performance measurement procedures, such as MDT, take advantage of these activities by logging network performance information that is already being collected or that can easily be collected with minimal extra effort. As used herein, "network performance information" refers to measurements of signal strength or signal quality measured by a mobile device.

In one type of MDT, referred to as "immediate MDT," the mobile device measures network performance information while in a connected state and reports the network performance information to the cellular network 400 in response to certain triggers or reporting conditions. This may occur, for example, when the mobile device 402 is connected for a voice call or for a data session.

In a second type of MDT, referred to as "logged MDT," the network directs the mobile device 402 to periodically log network performance information while it is operating in idle mode. That is, the mobile device 402 is directed to set a timer or use other methods to periodically log the network performance information. The time interval for logging the network performance information is generally selected so that it will not unduly drain the battery of the mobile device 402 or put an undue strain on the signaling capacity of the cellular network 400. The network performance information may include, for example, information on the signal strength received by the mobile device 402 from all of the base stations that it is able to detect.

After the mobile device 402 has generated a measurement, it logs the measurement to long-term storage, such as the local storage 310 (FIG. 3). Along with the measurement, the mobile device 402 may store metadata associated with the measurement, such as the time and geographical location at which the measurement was taken. The metadata may also include information describing the type of device of the mobile device 402. This allows the network provider to account for variations in antenna quality and receiver quality for individual mobile devices.

A problem that arises in systems using MDT is that there is no clear way to determine when the mobile device should stop the logging of network performance information. Determining when to stop logging is important because there is a tradeoff between the benefit that the network receives from the logging and the power that is consumed by the logging process. If a mobile device were configured to log network performance information continuously while in idle mode, the user would see an undesirable reduction in battery life. However, the logging must be carried out for enough time to produce useful data about the cellular network. Therefore, it is desirable to have a mechanism for stopping the logging after a certain amount of time.

Currently, however, this is not possible because of interactions between the different modes that mobile devices operate in. In particular, the cellular network configures a mobile device for logging performance information when the mobile device is operating in a connected mode because the mobile device must be in connected mode to receive configuration messages. However, the mobile device actually carries out network performance logging when it is operating in idle mode. In idle mode, the mobile device shuts down most of its activities except for those required to listen for network communications or to carry out network performance logging.

Current standards specify that the mobile device must release resources configured by the cellular network and cancel all active timers (with one exception unrelated to logging) when it transitions to idle mode. This causes a problem for the configuration of network performance logging because it requires canceling timers related to network performance logging. Thus, the current standards effectively require that logging be continuous during idle mode. This will unnecessarily drain the mobile device's battery and lead to a poor customer experience. Accordingly, the network performance logging system provides for specific mechanisms to enable a logging duration timer to set a time limit for network performance logging, even in the face of the requirement to cancel all pending timers during the transition to idle mode.

Figure 5:
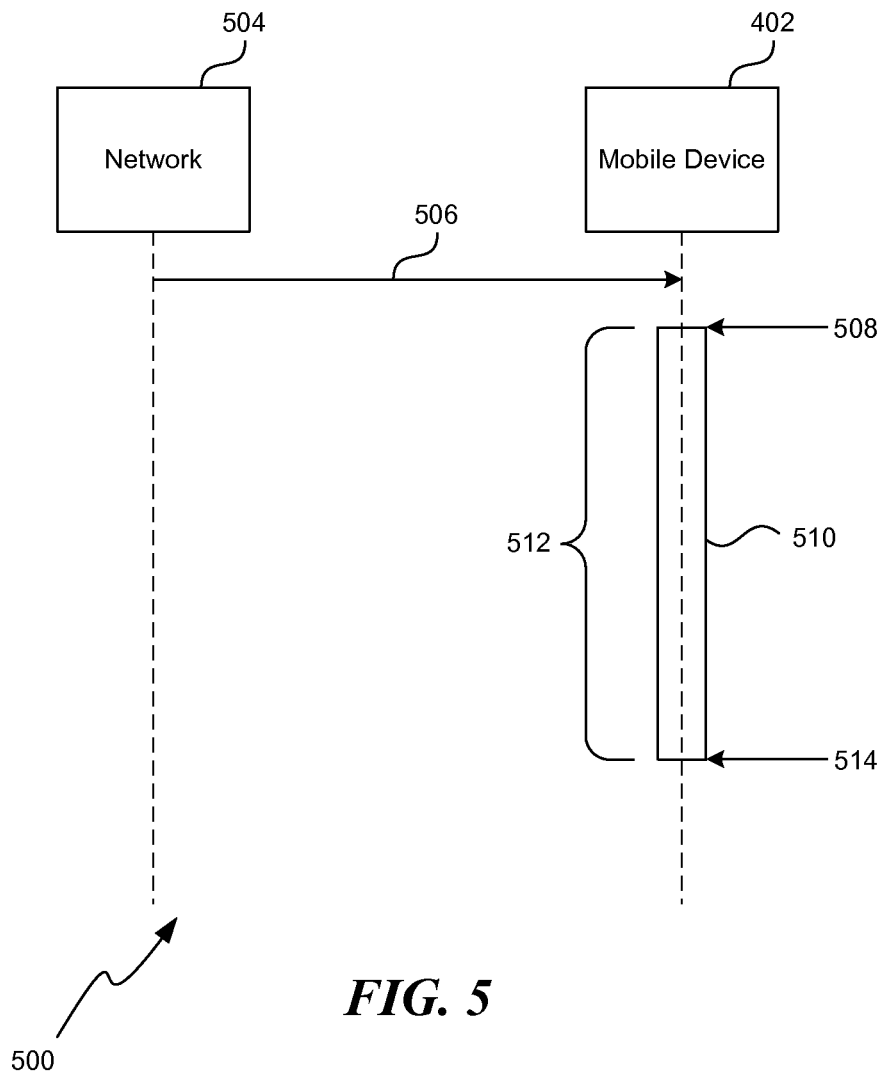
FIG. 5 is an exemplary timing diagram of a message exchange between the cellular network and the mobile device for logging the network performance information.

FIG. 5 is an exemplary timing diagram of a message exchange 500 between the cellular network and the mobile device for logging the network performance information. The message exchange 500 shows communication between a cellular network 504 and the mobile device 402. Although the network 504 is shown as a single entity, one skilled in the art will appreciate that the network 504 may consist of multiple distinct nodes, each of which will handle a portion of the functionality. For example, the network 504 may consist of a base transceiver station (BTS) that communicates wirelessly with the mobile device 402 but allows a higher level component, such as a base station controller (BSC), to manage configuration and resource allocation for the mobile device 402.

In the message exchange 500, the network 504 initially sends a configuration message 506 to the mobile device 402. The configuration message 506 configures the mobile device 402 to log network performance information and includes parameters to control logging. In some embodiments, the configuration message 506 may also specify a timeout period or duration for a logging duration timer that corresponds to the specific amount of time that the mobile device 402 may automatically log network performance information. The configuration message 506 may be a RRC message, such as the Logged Measurement Configuration message defined by 3GPP TS 25.331 and TS 36.331 specifications. In other embodiments, the timeout period or duration is specified at some time before the mobile device 402 receives the configuration message 506. For example, the time period or duration may be pre-specified as part of the mobile device's initial configuration when it joins the network or when it is initially placed in service. The configuration message 506 is sent when the mobile device 402 and the network 504 are engaged in some type of direct data communication, such as during a gaming session or a voice call. The mobile device 402 receives the configuration message 506 while it is operating in connected mode.

At a later time 508, the mobile device 402 transitions to idle mode. This may occur because the user has ended all data connections with the network 504. After the mobile device 402 transitions to idle mode, it starts logging network performance information according to the parameters defined in the configuration message 506. This logging activity is indicated by a logging duration 510, which shows the time duration during which the mobile device 402 is actively logging. Although logging duration 510 is shown as a continuous block, the mobile device 402 may be configured to log network performance information only at specified intervals during the logging duration 510. The logging duration 510 continues until specified time duration 512 has passed. As discussed above, the time duration 512 may be specified by the network 504 in the configuration message 506 or separately determined before the mobile device 402 received the configuration message 506. Regardless of how the time is specified, the mobile device 402 stops logging at stop time 514, after the time duration 512 has passed.

In the embodiment of FIG. 5, the time duration 512 begins at time 508, when the mobile device 402 transitions into idle mode. The stop time 514 then occurs after the time duration 512 has passed following the transition to idle mode. In an alternate embodiment, the time duration 512 begins after the mobile device 402 receives the configuration messages 506 and stores the configuration. In this embodiment, the mobile device 402 still begins logging network performance information only after it enters idle mode at time 508. In this embodiment, the mobile device 402 cancels some or all of the pending timers when it transitions to idle mode, as required by the standard, but it does not cancel the logging duration timer associated with the time duration 512.

Figure 6:
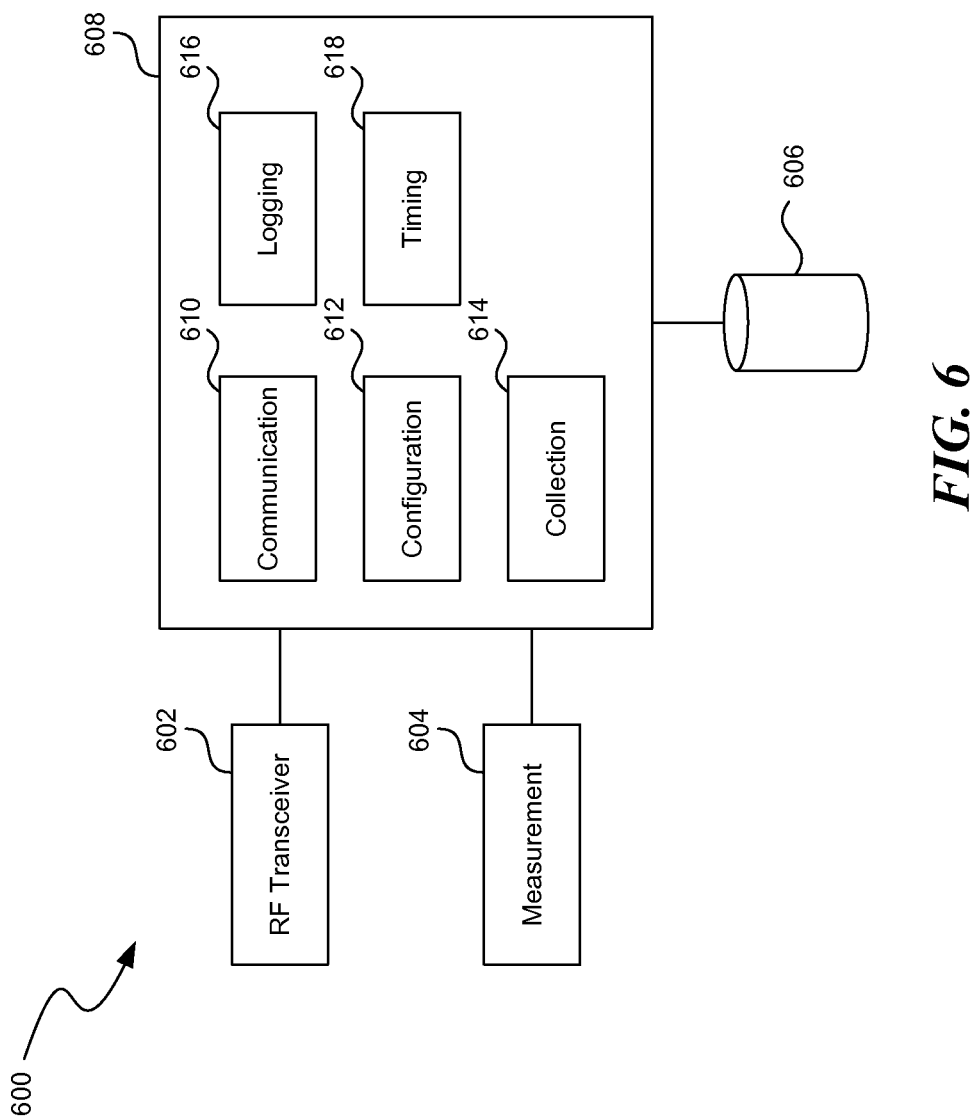
FIG. 6 is a logical block diagram of a network performance logging system.

FIG. 6 is a logical block diagram of a network performance logging system 600. The system 600 may be implemented by a computing device such as the mobile device 100 (FIG. 1). Aspects of this system may be implemented as special purpose hardware circuitry, programmable circuitry, or a combination of these. As will be discussed in additional detail herein, the system 600 comprises a number of modules to facilitate the functions of the system. The modules and their underlying code and/or data may be implemented in a single physical device or distributed over multiple physical devices in the functionality implemented by calls to remote services. Similarly, data could be stored in local storage or remote storage and distributed in one or more physical devices. Assuming a programmable implementation, the code to support the functionality of the system may be stored on a computer-readable medium such as an optical drive, flash memory, or a hard drive. One skilled in the art will appreciate that at least some of these individual modules may be implemented using ASICs, PLDs, or a general-purpose processor configured with software and/or firmware.

As shown in FIG. 6, the system 600 comprises a RF transceiver 602, which provides a hardware interface to handle communication between the mobile device and the cellular network. The RF transceiver 602 may include an antenna and associated processing for carrying out wireless communications according to the standards supported by the network. The system 600 also includes a measurement device 604, which measures network performance information as directed by the performance measurement configuration received from the network. The system 600 also includes a storage component 606, which stores the performance measurement configuration and logged network performance information.

The system 600 also includes a processing component 608, which is configured to control the mobile device's configuration for logging network performance information and execute the logging process. The processing component 608 includes various subcomponents to carry out its functionality. In particular, the processing component 608 includes a communication component 610, which uses the RF transceiver 602 to communicate with the cellular network. The communication component 610 exchanges configuration and reporting messages with the cellular network, including the messages discussed above with reference to FIG. 5. The communication component 610 provides the configuration messages to a configuration component 612, which manages the system's performance measurement configuration. The configuration component 612 stores the performance measurement configuration in the storage component 606. Other components in the system use the configuration component 612 to store new performance measurement configurations or to invalidate or clear an existing performance measurement configuration based on determinations made elsewhere in the system. This process is discussed in greater detail below.

The processing component 608 further includes a collection component 614, which is configured to collect network performance information using the measurement device 604. The collection component 614 collaborates with a logging component 616, which is configured to receive network performance information from the measurement device 604 and store the network performance information in a log in the storage component 606. The logging component 616 may also store related metadata in the log, such as the device type, the time that the measurement was taken, and the geographical location where the measurement was taken.

In some embodiments, the collection component 614 and the measurement device 604 make their measurements on a pilot tone that is broadcast by each base station. The pilot tone is a standardized signal that is broadcast at fixed power on a known frequency. The pilot tone may be the Broadcast Control Channel (BCCH) in GSM, the Primary Common Pilot Channel (P-CPICH) in UMTS Terrestrial Radio Access (UTRA) Frequency Division Duplexing (FDD), the Primary Common Control Physical Channel (P-CCPCH) in UTRA Time Division Duplexing (TDD), or a cell-specific reference signal in LTE. As a result, the pilot tone provides a useful baseline for evaluating the signal strength for the base station at a particular location. In these embodiments, the measurement device 604 and the collection component 614 tune to the pilot tone and measure its signal strength or other signal information. The collection component 614 then provides the signal information to the logging component 616, which stores the signal information, as well as the metadata, in the storage component 606.

The processing component 608 also includes a timing component 618, which is configured to control the timing of the system's logging activity. The timing component 618 determines how long a logging duration timer will allow the mobile device to carry out the logging. In some embodiments, this logging duration is specified by the cellular network per the logging configuration message. In other embodiments, the logging duration is determined before the network sends the configuration message; for example, the time duration may be pre-specified when the mobile device is initially placed in service or as part of the mobile device's initial configuration when it joins the cellular network. In some embodiments, the logging duration timer is the T326 timer specified by 3GPP TS 25.331 or the T330 timer specified by 3GPP TS 36.331. The time duration may be any suitable length of time, such as 10 minutes, 20 minutes, 40 minutes, 60 minutes, 90 minutes, or 120 minutes. Moreover, one skilled in the art will appreciate that the time duration may be increased or decreased as needed to balance the requirements of collecting useful network performance information and avoiding undue drain on the mobile device's battery. Thus, the timing component 618 is configured to start the logging duration timer based on the configuration of the system and to direct the logging component 616 and the collection component 614 to stop logging when the timer expires.

Figure 7:
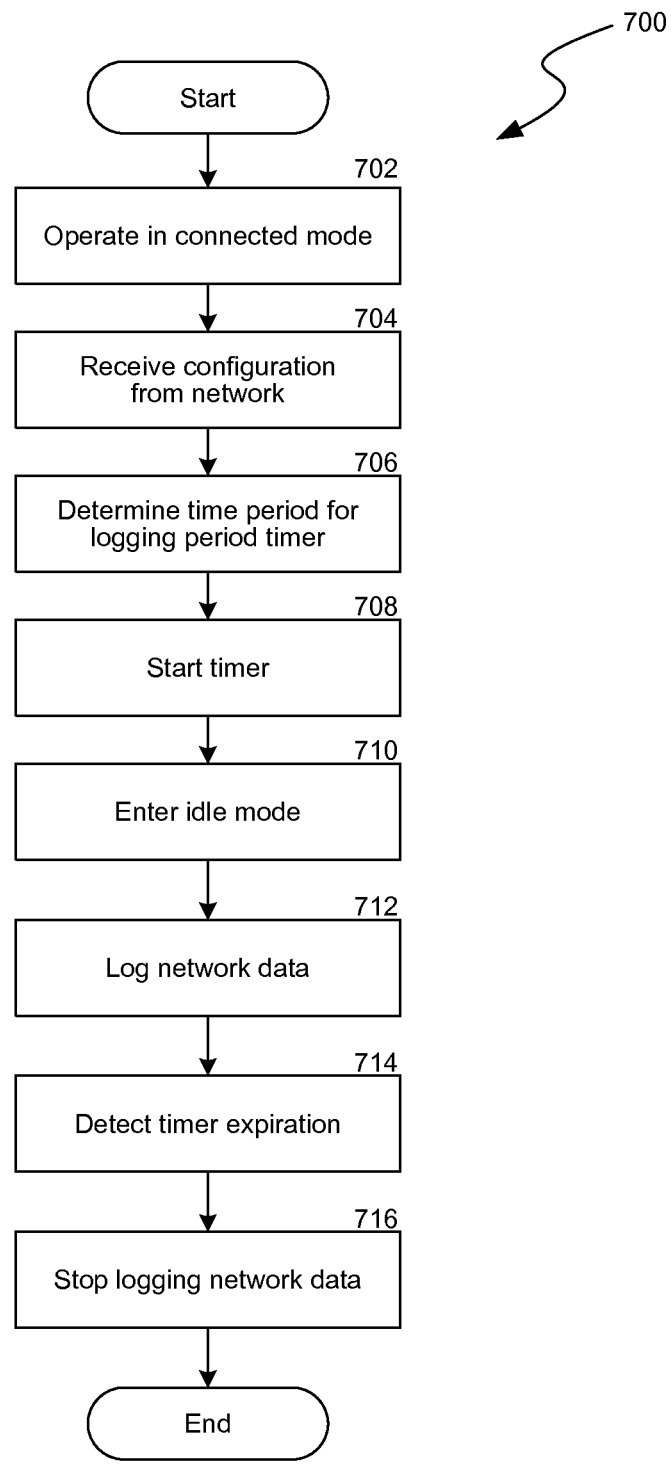
FIG. 7 is a flowchart of a process for controlling the timing of network performance information logging according to a first embodiment of the network performance logging system.

FIG. 7 is a flowchart of a process 700 for controlling the timing of network performance information logging according to a first embodiment of the network performance logging system. Processing begins at block 702, where the mobile device operates in a connected mode. As discussed above, this generally occurs when the mobile device is exchanging data with the cellular network, such as during a telephone call or a data communication session. Processing then proceeds to block 704, where the mobile device receives a configuration message from the cellular network while it is operating in the connected mode. The mobile device stores the configuration in the storage component 606 and configures the collection component 614 and the logging component 616 with the logging parameters provided in the configuration message. As discussed above, the network generally transmits the configuration in a control message (e.g., a RRC message) when the mobile device has a connection with the network.

Processing then proceeds to block 706, where the system determines the time duration to be used for the logging duration timer. As discussed above, the timer value may be contained within the configuration message received in block 704 or determined using configuration information stored separately by the mobile device. Processing then proceeds to block 708, where the system starts the logging duration timer.

Processing then proceeds to block 710, where the mobile device enters the idle mode. A mobile device operates in idle mode when it is not actively engaged in any communications with the cellular network. In general, idle mode is a low power mode in which the device consumes the minimum power necessary to maintain contact with the network (e.g., receiving paging messages from the network). As discussed above, the transition to idle mode may occur at any time after the system receives the configuration message from the network and is not dictated by the logging configuration. The transition is carried out according to the relevant cellular standards, which specify that the mobile device cancels almost all of the pending timers during the transition. However, the mobile device continues to run the logging duration timer even after it cancels the other pending timers.

Processing then proceeds to block 712, where the mobile device collects and logs network performance data as directed by the measurement configuration received in block 702. In this step, the mobile device receives network performance information from the measurement device 604 and stores it in the storage component 606. As discussed above, the mobile device may also store metadata associated with the network performance information. In general, the mobile device measures network performance and logs the resulting information at an interval specified by the measurement configuration. The interval is generally selected so that the mobile device will collect information that is useful for the network provider while not unnecessarily draining the device's battery.

Processing then proceeds to block 714, where the timing component 618 detects the expiration of the logging duration timer. Processing then proceeds to block 716, where the timing component 618 directs the system to stop logging network performance information. The process 700 then exits.

Figure 8:
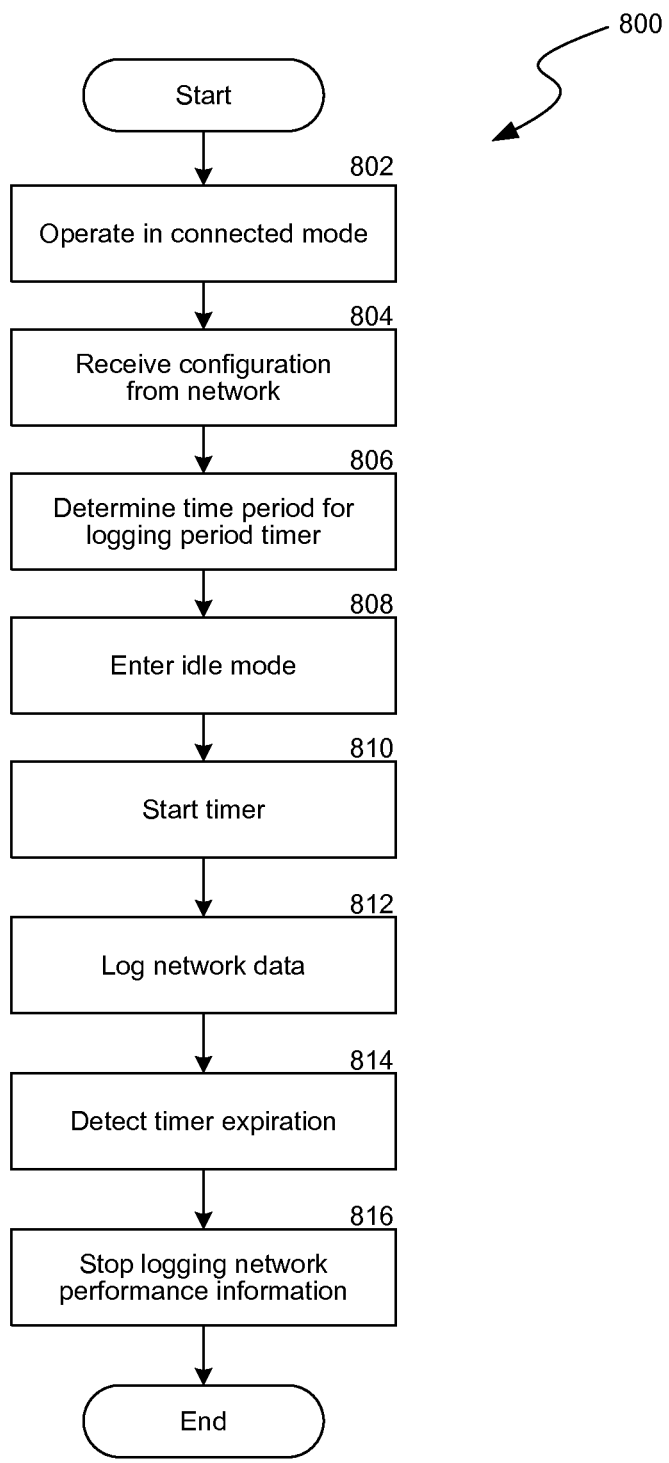
FIG. 8 is a flowchart of a process for controlling the timing of network performance logging according to a second embodiment of the network performance logging system.

FIG. 8 is a flowchart of a process 800 for controlling the timing of network performance logging according to a second embodiment of the network performance logging system. Processing begins at block 802, where the system operates the mobile device in connected mode, as discussed above. Processing then proceeds to block 804, where the system receives a configuration message from the network specifying the parameters of the network performance logging. Processing then proceeds to block 806, where the system determines the value of the logging duration timer. The processing of blocks 802-806 is generally the same as the processing of the corresponding steps of the process 700 of FIG. 7. However, in the process 800, the system does not immediately start the logging duration timer. Rather, processing proceeds to block 808, where the mobile device enters the idle mode. As with the process of FIG. 7, the transition to idle mode may occur at any time after the system receives the configuration message from the network and is not dictated by the logging configuration.

On entering the idle mode, the system proceeds to block 810, where it starts the logging duration timer. The system then proceeds to block 812, where it begins logging network performance information according to the procedure discussed above. In general, the mobile device is configured to start logging as soon as it enters the idle mode. Thus, the processing of block 812 will generally begin soon after the processing of blocks 808 and 810 is complete.

Processing then proceeds to block 814, where the timing component 618 detects the expiration of the logging duration timer. After the logging duration timer expires, processing proceeds to block 816, where the system stops logging network performance information. The process 800 then exits.

From the foregoing, it will be appreciated that specific embodiments of the invention have been described herein for purposes of illustration, but that various modifications may be made without deviating from the scope of the invention. Accordingly, the invention is not limited except as by the appended claims.

I claim:

1. A computer-implemented method for controlling the timing of an automatic network performance measurement of a cellular network in a mobile device having a processor and a storage area, the method comprising:

receiving a configuration from the cellular network while the mobile device is operating in a connected mode, the configuration specifying parameters relating to network performance logging to be performed by the mobile device;

based on the configuration, configuring the mobile device to automatically log network performance information for the cellular network in the storage area;

starting a logging duration timer while the mobile device is operating in connected mode, wherein the mobile device is configured to perform radio frequency transmissions while in the connected mode, the logging duration timer corresponding to a specified time duration over which the mobile device logs the network performance information;

transitioning the mobile device from the connected mode to an idle mode, wherein transitioning comprises canceling at least a portion of all active timers, the at least a portion of all active timers not including the logging duration timer, wherein canceling at least a portion of all active timers includes canceling or stopping all timers except the logging duration timer and at least one additional timer;

logging the network performance information according to the configuration; and stopping logging the network performance information in response to the logging duration timer expiring;

wherein the logging of the network performance information is a part of a Minimization of Drive Tests (MDT) procedure;

wherein the logging duration timer is timer T326 or timer T330.

2. The method of claim 1, wherein the specified time duration is specified by the cellular network in the configuration.

3. The method of claim 1, wherein the specified time duration is predetermined before the mobile device receives the configuration.

4. The method of claim 1, wherein the specified time duration is one of 10 minutes, 20 minutes, 40 minutes, 60 minutes, 90 minutes, or 120 minutes.

* * * * *